(12) United States Patent
Tanabe

(10) Patent No.: US 8,397,597 B2
(45) Date of Patent: Mar. 19, 2013

(54) RACK BAR AND METHOD FOR PRODUCTION THEREOF

(75) Inventor: Keiji Tanabe, Inuyama (JP)

(73) Assignee: Kondo Seiko Co., Ltd. (JP)

( * ) Notice: Subject to any disclaimer, the term of this patent is extended or adjusted under 35 U.S.C. 154(b) by 104 days.

(21) Appl. No.: 13/167,958

(22) Filed: Jun. 24, 2011

(65) Prior Publication Data

US 2012/0258329 A1   Oct. 11, 2012

(30) Foreign Application Priority Data

Apr. 11, 2011   (JP) ................... 2011-087131

(51) Int. Cl.
*F16H 1/04*   (2006.01)

(52) U.S. Cl. .............. 74/422; 74/109; 29/34 R

(58) Field of Classification Search .......... 74/89.11, 74/109, 120, 422; 29/34 R, 33 R, DIG. 18
See application file for complete search history.

(56) References Cited

U.S. PATENT DOCUMENTS

| | | | | |
|---|---|---|---|---|
| 3,148,571 A * | 9/1964 | Wallis | ................ | 83/82 |
| 3,844,181 A * | 10/1974 | Bayle | ................ | 74/498 |
| 4,133,221 A * | 1/1979 | Clary | ................ | 74/498 |
| 5,860,323 A * | 1/1999 | Mizutani et al. | ................ | 74/422 |
| 6,502,473 B1 * | 1/2003 | Akiyama et al. | ............. | 74/89.17 |
| 7,225,541 B2 * | 6/2007 | Kubota | ................ | 29/897.2 |
| 7,258,034 B2 * | 8/2007 | Kim | ................ | 74/388 PS |
| 7,739,793 B2 * | 6/2010 | Yamamoto et al. | ........ | 29/893.34 |
| 2008/0202270 A1 * | 8/2008 | Yamawaki | ................ | 74/422 |

FOREIGN PATENT DOCUMENTS

| | | |
|---|---|---|
| JP | 61228161 | 10/1986 |
| JP | 2003-094140 A | 4/2003 |
| JP | 2005247311 | 9/2005 |
| JP | 2006035298 | 2/2006 |
| JP | 2007-253190 A | 10/2007 |
| JP | 2008213756 | 9/2008 |
| JP | 2008286364 | 11/2008 |
| JP | 2009156449 | 7/2009 |

* cited by examiner

*Primary Examiner* — David M Fenstermacher

(74) *Attorney, Agent, or Firm* — Bacon & Thomas, PLLC

(57) ABSTRACT

A rack bar and a method for production thereof. The rack bar is composed of a steel pipe (10) and an embedded metal core (14) placed therein. The steel pipe has rack teeth formed thereon by forging. The embedded metal core (14) is made of a metal softer than the steel pipe (10) and has its surface wave-shaped such that the bottom (20) is wide and the top (22) is narrow.

7 Claims, 3 Drawing Sheets

RACK BAR AND METHOD FOR PRODUCTION THEREOF

BACKGROUND OF THE INVENTION

1. Field of the Invention

The present invention relates to a rack bar and a method for production thereof.

2. Description of the Related Art

The conventional way of forming rack teeth by cold forging alone employed a pipe material with good plastic properties and a special processing machine such as a hydraulic press.

Cold forging to form rack teeth needs six to eight steps and takes a long working time. Moreover, it tends to cause defects to the tip of the formed tooth. This leads to a cost increase and quality variation.

By contrast, hot forging to form rack teeth with rapid heating to 700-800° C. involves low deformation resistance which is one-forth to one-fifth of that involved in cold forging. This results in a good flow in the part being worked, which makes it possible to finish 90-98% by one step of forming, with only one step left for finishing by cold forging. Forming in this way, which is semi-hot forging that takes place immediately before transformation point, prevents growth of crystal grains (due to short heating) and shortens time for oxidation and reduces surface oxidation.

About 90% of commercially available rack bars are currently produced by cutting from solid rod stock. Production of rack bars by cutting from solid rod stock needs more material and higher processing cost as compared with production from pipe stock.

A typical hollow rack bar having an outside diameter of 28 mm and a bore diameter of 20 mm is comparable in strength to a solid rack bar having an outside diameter of 26 mm, both being equal in length.

Tables 1 and 2 show the amount of the raw material and the weight of the finished rack bar for the solid rack bar and the hollow rack bar, respectively.

The solid rack bar is inferior in rack tooth strength to the hollow rack bar because it is formed from a rod stock and hence has its fiber flow parallel to the core, with its teeth cut across its fiber flow, which is undesirable for the bending strength of teeth. Consequently, the solid rack bar needs a large tooth thickness and width.

Japanese Patent Laid-open No. 2003-94140 discloses a method for forming a rack bar from a pipe stock. This method consists of performing plastic working, with a mandrel (harder than the pipe) inserted into the bore of the pipe, so that teeth project outward. This method is subject to such defects as unbalanced fiber flow, surface cracking, surface seizure, and large spring back, which are characteristic of cold plastic working. Prevention or reduction of these defects needs stringent specifications, processing conditions, and processing controls, which leads to an increase in forging steps. This in turn leads to a higher material cost, higher processing cost, and higher quality cost for stable quality assurance in mass production.

On the other hand, Japanese Patent Laid-open No. 2007-253190 discloses a method for producing rack bars from pipe stock by forging from its outside. This method is characterized as follows.

(a) This method employs a steel pipe from which the rack bar is formed. The pipe has a structure imparted by heat treatment which is suitable for cold forging.

(b) After tooth forming, that part of the rack bar opposite to the rack tooth undergoes heat treatment for local hardening. This hardening reduces elongation and bending due to forging load. Unfortunately, this method involves difficulties in accurately forming the back side of the tooth. Any angular displacement would harm the accuracy of rack teeth.

(c) This method employs a core mold harder than the steel pipe in order to form rack teeth.

(d) This method basically relies on cold forging and hence needs a steel pipe with good plasticity (such as the one which has undergone annealing) because cold forging (particularly in the initial stage) encounters a high deformation resistance (which is 2.5 to 4 times that of hot forging). Nevertheless, this method needs local heating or warm working (at 100 to 600° C.) for the tooth forming part. This temperature range is the one in which the steel pipe remains brittle, and hence heating at such temperatures is undesirable for quality assurance because temperature variation causes shrinkage, thereby deteriorating the accuracy of rack teeth.

SUMMARY OF THE INVENTION

It is an object of the present invention to provide a method for economically producing rack bars with high accuracies.

The rack bar according to the present invention is comprised of a steel pipe and an embedded metal core placed therein. The steel pipe has rack teeth formed thereon by forging. The embedded metal core is made of a metal softer than the steel pipe and has its surface wave-shaped such that the bottom is wide and the top is narrow.

The steel pipe should preferably be a welded one and the embedded metal core should preferably be one which is made of soft low-carbon steel.

According to the present invention, the rack bar is produced by the method which includes the steps of: rapidly heating a steel pipe at its rack tooth forming part up to 700° C. to 800° C. by high-frequency heating; placing an embedded metal core made of a metal softer than the steel pipe at that region of the bore of the steel pipe which corresponds to the rack tooth forming part during heating or immediately after heating; and performing hot forging on the steel pipe which has the embedded metal core placed therein.

The foregoing method for producing the rack bar further includes the steps of: annealing the hot-forged product after hot forging; performing coating for cold forging; and performing cold forging for finishing on the steel pipe which has the embedded metal core placed therein.

The foregoing method for producing the rack bar should preferably be modified such that the embedded metal core has its surface wave-formed at the time of hot forging, with the wave form having a wide bottom and a narrow top. The steel pipe should preferably be a welded one, and the embedded metal core is one which is made of soft low-carbon steel.

The method according to the present invention, which is characterized in that the embedded metal core placed in the bore of the steel pipe is made of a metal softer than the steel pipe, permits the surface of the embedded metal core to be wave-formed at the time of hot forging, and this makes it easy to form rack teeth in a special shape suitable for the rack bar.

The present invention produces the following effects.

(1) The rack bar can be produced from commercial welded pipes conforming to JIS standards, without necessity for any special heat treatment such as spheroidizing annealing.

(2) The rack bar (as a single part on the motor vehicle) is lighter in weight by 25-30% than conventional ones.

(3) The manufacturing method involves rapid local heating at 700-800° C. and ensuing hot forging, which remarkably reduces deformation resistance to one-fourth to one-fifth that of cold forging. This leads to size reduction of forging equipment, cost reduction of forging dies, reduced heating time and forging time which decrease surface oxidation, and small temperature fluctuation which contributes to forging accuracies and stable quality.

(4) The manufacturing process saves cost for forging dies.

(5) The manufacturing process involves a low deformation resistance at the rack tooth forming part (about 30% less than before) because, unlike the conventional process, it does not need removal of the embedded metal core from the forged product after forging. Moreover, the rack bar retains the embedded metal core after forging, which improves the strength of the rack teeth and the flexure strength of the rack bar. Forging in the foregoing way gives rise to good fiber flow in the bottom of teeth, thereby improving strength.

(6) The manufacturing process needs only a low working ratio in finish cold forming. This lead to an accurate consistent smooth surface roughness.

(7) The manufacturing process can be accomplished rapidly with a less number of steps. This leads to a reduced processing cost.

(8) The manufacturing process can achieve a cost reduction by 30 to 45%.

The following is a description of the preferred embodiment of the present invention.

According to the present invention, the rack bar is produced as follows from a steel pipe and an embedded metal core which is softer than the steel pipe. The steel pipe is rapidly heated to 700-800° C. at its part where rack teeth are to be formed. During heating or immediately after heating, the steel pipe has its bore filled with a rod-like metal core which is placed in a region corresponding to the rack tooth forming part. The steel pipe holding the embedded metal core therein undergoes hot forging. The hot-forged steel pipe is annealed. It may optionally undergo coating for cold forging. Subsequently, the hot-forged steel pipe holding the embedded metal core undergoes cold forging for finishing.

The cold forging for finishing is followed by almost the same steps as conventional known ones.

The method according to the present invention works in such a way that the embedded metal core once placed in the bore of the steel pipe is not removed from the forged product. Therefore, the rack bar finished by hot-forging or cold forging holds therein the embedded metal core which has a wave-shaped surface.

The following is a detailed description of the embodiment of the present invention.

(1) The rack bar is produced from a steel pipe (especially a welded steel pipe) as a raw material. This offers an advantage of saving the weight of raw material and finished product and obviating the necessity for spheroidizing annealing.

(2) The rack bar is produced by rapidly heating the steel pipe at its tooth forming part to 700-800° C. This local rapid heating is mainly intended to reduce deformation resistance, but it is also intended to prevent crystal grains from growing to become coarse. To this end, the heating temperature should be lower than the transformation point and heating should be immediately followed (preferably within 3 seconds) by forging so that heating will not cause surface oxidation appreciably. Forging in this way forms rack teeth having dimensions and shape close to those of the finished ones.

(3) Prior to hot forging, or preferably during or immediately before local heating, the bore of the steel pipe is filled with a rod-like embedded metal core which is placed in the region corresponding to the tooth-forming part. The rod-like embedded metal core should be one made of low-carbon steel (such as S15C and S10C) softer than the steel pipe. The embedded metal core is designed mainly to form adequate rack teeth by hot forging, with its surface deformed into wave-shape. Hot forging, with the embedded metal core placed in the bore of the steel pipe, forms rack teeth having a thick bottom and also reduces deformation resistance (at the bottom of rack teeth) by about 30% as compared with that involved in the case where a conventional hard core is employed. Moreover, the soft embedded metal core reduces distortion that occurs when the tooth surface undergoes quench hardening.

The rack teeth should preferably have a D-shaped cross section (in the direction perpendicular to the axis). When the rack bar receives a steering force, the rack teeth are subject to distortion more than the cylindrical part but this distortion is reduced on account of the embedded metal core. In addition, distortion due to steering force is also reduced at the bottom of the rack teeth.

Another effect of the embedded metal core is that a desired strength is achieved with a steel pipe having a thinner wall thickness.

(4) The cold forging for finishing, which is performed only once in one step, easily achieves high accuracy, with small variation in dimensions, and smooth surface (better than machined products).

(5) Those steps subsequent to the cold forging for finishing may be carried out in the same way as conventional ones.

(6) The rack bar produced as mentioned above will not need steps for detection of quench cracks, because the hot forging to form the rack teeth does not break the fiber structure of the raw material.

(7) The method according to the present invention is most suitable for production of the rack bar for the steering system of rack-pinion type for passenger cars.

(8) The steel pipe to be used as the pipe stock may be selected from welded steel pipes conforming to JIS standards.

BRIEF DESCRIPTION OF THE DRAWINGS

Embodiments of the present invention will be described in detail based on the following figures, wherein:

FIG. 1 does not show the wave shape on the surface of the embedded metal core and the left positioning jigs;

FIG. 2 does not show the wave shape on the surface of the embedded metal core.

DETAILED DESCRIPTION OF THE INVENTION

In one embodiment according to the present invention, the rack bar was produced from the steel pipe 10, which is a welded steel pipe conforming to JIS standards.

Figure 1:
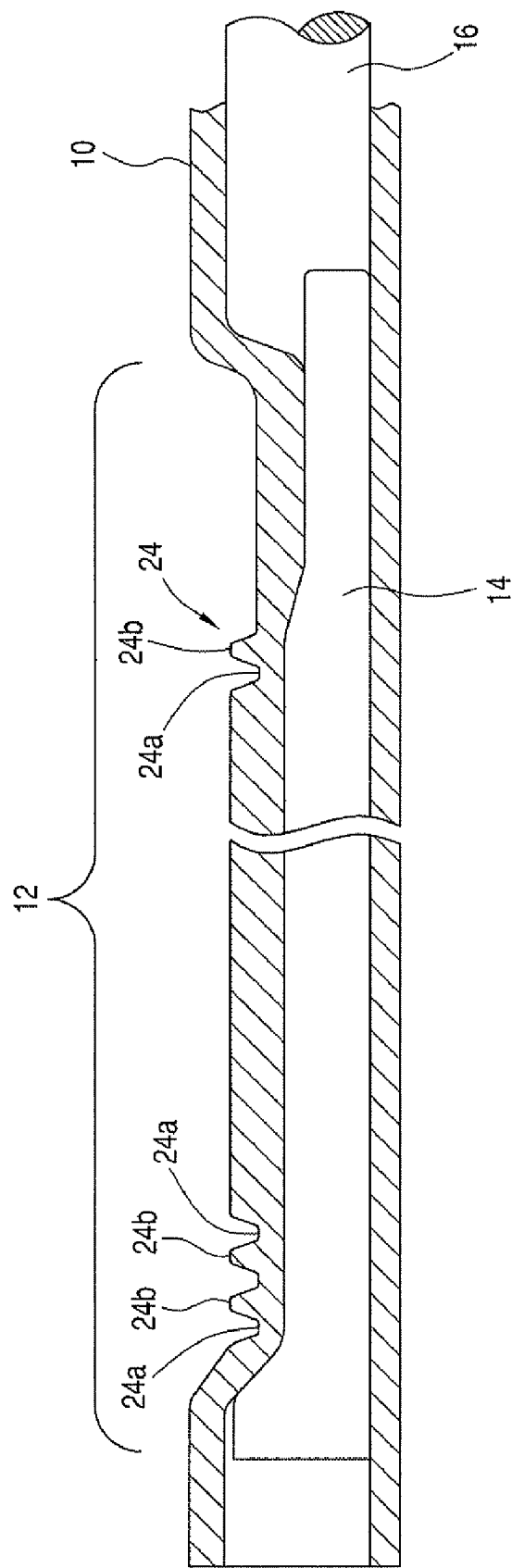
FIG. 1 is a sectional view showing the rack bar which has undergone hot forging while the bore of the steel pipe is filled with an embedded metal core and positioning jigs placed at both ends thereof.

Production of the rack bar started with filling that region of the bore of the steel pipe 10, which corresponds to the tooth forming part 12, with the embedded metal core 14, which was subsequently fixed by the positioning jigs 16 placed at the right and left ends thereof. (Only one of them is shown in FIG. 1.)

The bore of the steel pipe 10 was filled with the embedded metal core 14 immediately before or during local heating.

The steel pipe 10 underwent rapid heating locally at the tooth forming part 12. The heating temperature was 700-800° C., which is lower than the transformation point. Immediately after heating (especially within 3 seconds), forging was completed so that surface oxidation due to heating was alleviated.

The embedded metal core 14 was a rod-like one made of low-carbon steel (such as S15C and S10C) softer than the steel pipe 10.

Figure 2:
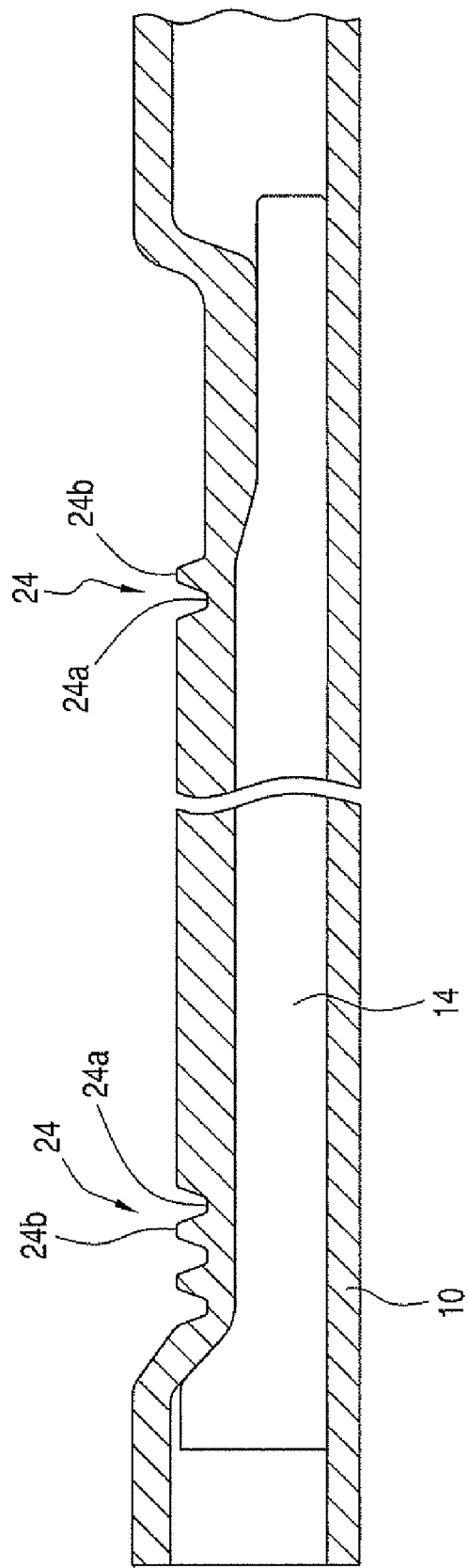
FIG. 2 is a sectional view showing the rack bar which has been finished by cold forging subsequent to hot forging, with the embedded metal core left in the bore of the steel pipe and with the positioning jigs removed from the bore of the steel pipe.

FIG. 2 is a sectional view showing the rack bar which had been finished by quenching, coating, and cold forging subsequent to hot forging, with the right and left positioning jigs 16 removed from the bore of the steel pipe 10.

The rack bar shown in FIG. 2 seemingly resembles that shown in FIG. 1 except for the positioning tools 16. In fact, they differ from each other in that the latter underwent annealing, coating for cold forging, cold forging, and other steps. In other words, FIG. 2 shows the rack bar which has been finished by cold forging.

The main object of inserting the embedded metal core 14, which is made of a metal softer than the steel pipe 10, is to change its surface into a wave-shaped one by forging, so that the bottom of the rack tooth becomes thicker than that obtained by the conventional method which employs a hard core.

The embedded metal core 14 may be a rod-like one with a flat surface and its surface is changed into a wave-shape as the rack teeth 24 are formed by hot forging. Alternatively, the embedded metal core 14 may be a rod-like one with a wavy surface and its surface is changed into a wave-shape by hot forging.

Figure 3:
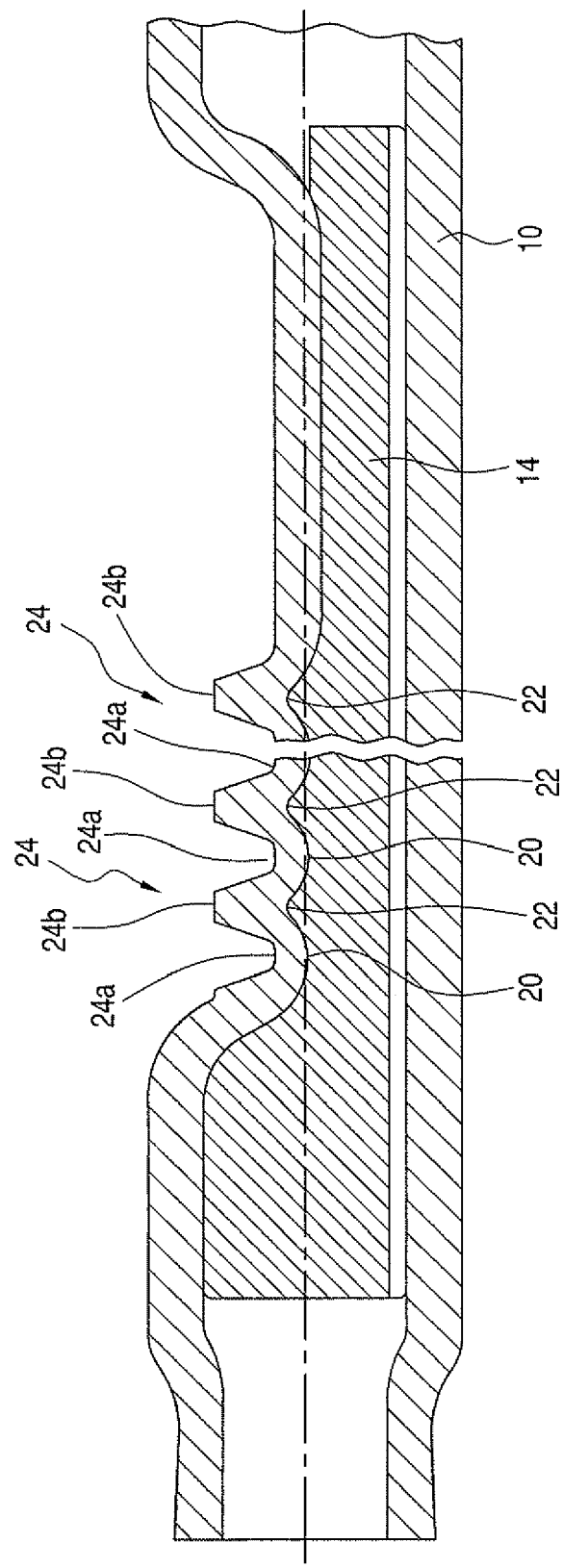
FIG. 3 is a detail sectional view showing the cold-forged rack bar shown in FIG. 2, with both ends thereof finished by drawing.

Although not shown in FIGS. 1 and 2, the surface of a longitudinal section of the embedded metal core 14 should be made into a wave-shaped one by hot forging as shown in FIG. 3. Specifically, the wave-shaped surface has peaks defining top surfaces 22 and troughs defining bottom surfaces 20, wherein the bottom surface is wider than the top surface and wherein the bottom surface has a larger curvature than the top surface. Even though the rod-like embedded metal core 14 has a flat surface, it can be made into such a special form by hot forging because it is made of a metal softer than the steel pipe 10.

The hot forging should preferably be carried out in such a way that the surface of the embedded metal core 14 is made wavy and the teeth 24 are formed in the tooth-forming part 12 of the steel pipe 10 in such a way that the tooth bottom 24a is wide, the top 24b is sufficiently high from the tooth bottom 24a, and the tooth bottom 24a is thicker than that which would be obtained when the embedded metal core 14 is absent.

The embedded metal core 14, which is softer than the steel pipe 10, reduces the deformation resistance of the tooth bottom 24a by about 30% as compared with the conventional hard metal core.

The illustrated rack teeth 24 have a D-shaped cross section (in the direction perpendicular to the axis). When the rack bar receives a steering force, the rack teeth 24 are subject to distortion more than the cylindrical part but this distortion is reduced on account of the embedded metal core 14.

The rack bar that undergoes hot forging, with the embedded metal core 14 inserted into the steel pipe 10, can be produced from the steel pipe 10 which has a smaller wall thickness than an ordinary steel pipe which is not provided with the embedded metal core 14.

The hot forging may optionally be followed by cold forging for finishing as shown in FIG. 2, so that the resulting rack bar has a high dimensional accuracy. The finishing cold forging is carried out only once in one step.

The finishing cold forging may optionally be followed by miscellaneous steps in the same way as the conventional process.

The hot forging and cold forging can be carried out by using well-known forging machines for solid bars, except for the die. Thus, the illustration of the forging machines is omitted here. The die for forging may be the same one as used for solid bars; however, it is desirable to design an adequate one that enhances the foregoing feature of the present invention (especially the shape of the rack teeth and the surface of the embedded metal core which are formed by hot forging and cold forging).

TABLE 1

Amount of Raw Material for Rack Bars, 679 mm in Length

| | Raw material | Ratio | |
|---|---|---|---|
| Solid type | 2,938 g | 100% | |
| Hollow type | 2.058 g | 70% | Including embedded core metal (250 g) |
| Difference | 880 g | 30% | |

TABLE 2

Weight of Finished Rack Bar (mounted motor vehicle)

| | Weight | Ratio | |
|---|---|---|---|
| Solid type | 2,628 g | 100% | |
| Hollow type | 1,940 g | 73.8% | Including embedded core metal (250 g) |
| Difference | 688 g | 26.2% | |

What is claimed is:

1. A rack bar comprising a steel pipe with rack teeth and a bore, and a metal core which is embedded in the bore of the steel pipe, wherein the rack teeth are formed by forging the steel pipe, wherein the metal core is made of a metal softer than the steel pipe, wherein the metal core has a section with a surface which is wave-shaped in longitudinal cross-section with alternating peaks and troughs, each peak presenting a top surface and each trough presenting a bottom surface, and wherein the bottom surface is wider than the top surface.

2. The rack bar according to claim 1, wherein each bottom surface has a larger curvature than the curvature of each top surface.

3. The rack bar according to claim 1, wherein the steel pipe is a welded steel pipe, and the metal core is made of a soft low-carbon steel.

4. A method for producing a rack bar, the method comprising the steps of:
heating a rack tooth forming part of a steel pipe with a bore up to a temperature of 700° C. to 800° C. by high-frequency heating;
placing a metal core made of a metal softer than the steel pipe in the bore of the steel pipe along the rack tooth forming part during the heating or immediately after the heating;

forming rack teeth on the rack tooth forming part of the steel pipe by hot forging in such a way that the metal core made of a metal softer than the steel pipe is embedded in the steel pipe, and forming a wave-shaped surface, with alternating peaks and troughs, on a longitudinal section of the metal core during the hot forging, each peak presenting a top surface and each trough presenting a bottom surface, and wherein the bottom surface is wider than the top surface.

5. The method according to claim 4, which further comprises the steps of:

annealing the hot-forged rack bar after the hot forging;

thereafter forming a coating on the rack bar for cold forging; and performing the cold forging so as to finish the rack bar wherein the metal core-made of a metal softer than the steel pipe is embedded in the steel pipe.

6. The method according to claim 4, wherein each bottom surface has a larger curvature than the curvature of each top surface.

7. The method according to claim 4, wherein the steel pipe is welded steel pipe, and the metal core is made of a soft low-carbon steel.

* * * * *